United States Patent Office 3,176,759
Patented Apr. 6, 1965

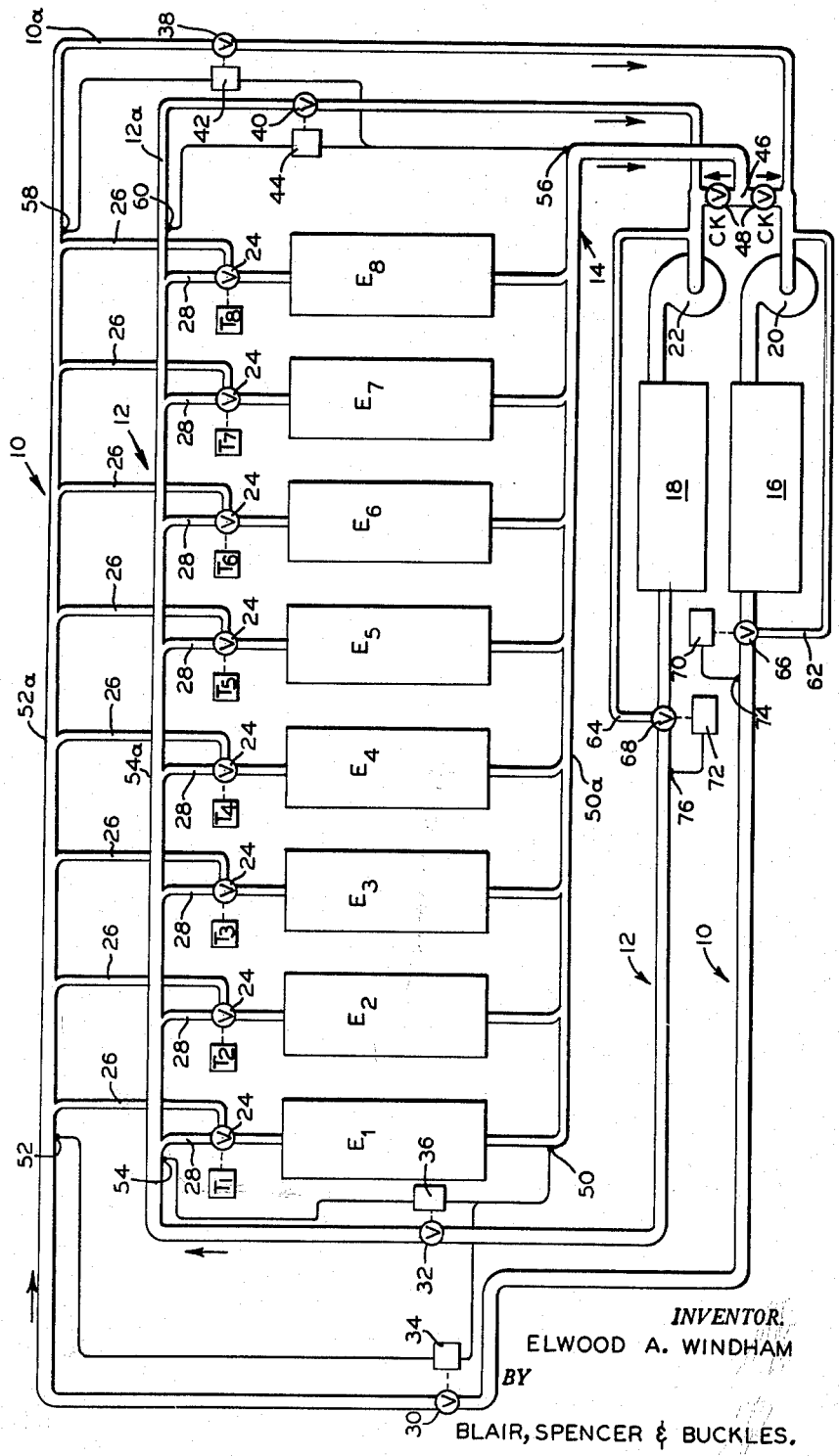

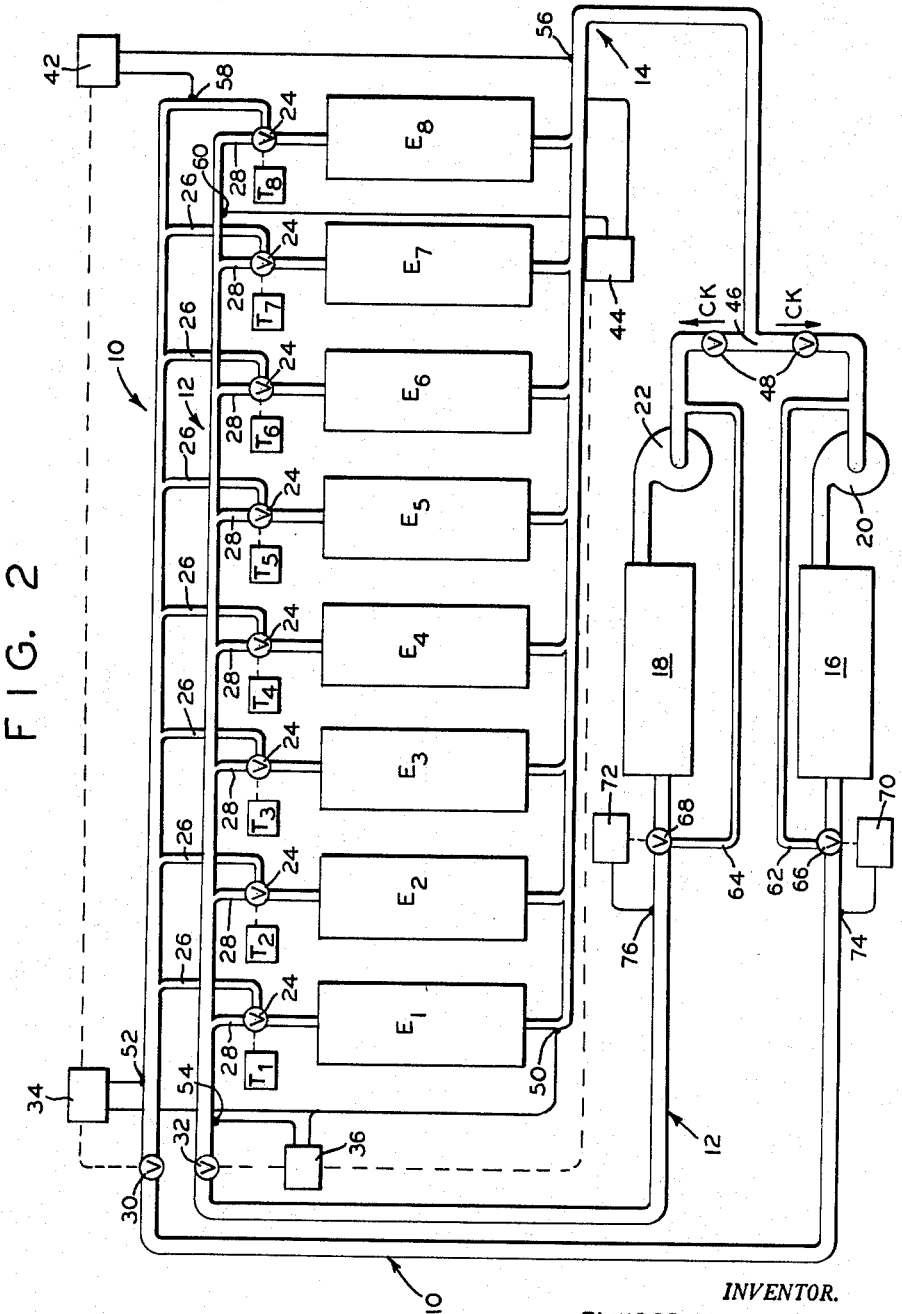

3,176,759
AIR CONDITIONING SYSTEMS
Elwood A. Windham, 782 E. Broad St., Westfield, N.J.
Filed June 3, 1960, Ser. No. 33,694
12 Claims. (Cl. 165—22)

This invention relates to apparatus and systems for increasing the efficiency of air conditioning and, more particularly, to an air conditioning system having a common hot and cold water return, wherein the cooling load on the refrigeration compressor is safely and efficiently controlled during periods of simultaneous heating and cooling of areas of a building.

Air conditioning systems employing a common return conduit are well known in the art and generally provide for a single return pipe for both hot and cold water after it is passed through heat exchangers in the various rooms or areas of a building. After being mixed in the common return, the return water is then divided to be again passed through the heater and cooler of the system. The ratio of water returned to either the heater or the cooler is dependent on the amount of water that is being pumped by the heating or cooling unit, i.e., the amount of heated or cooled water that is being used in the system. The use of a common return greatly reduces the expense of installation of air conditioning systems in that fewer pipes are required to return the system water to the respective heating and cooling units.

As can be readily seen, one of the primary problems encountered in the use of a common return results from the mixing of the hot and cold return water. During periods requiring simultaneous heating and cooling of different areas of a building, the temperature of this return water is all important, and in many cases results in an overloading of the cooling compressor. Such overloading generally occurs during those times when the temperature outside the building is between 45 and 60 degrees, for in this temperature range cooling in one part of the building and heating in another may be required. For example, during such intermediate temperatures, the sun may be shining brightly on the south and west exposures of the building, resulting in inside temperatures that require cooling, while the north and east exposures of the building are shaded, and will require heating. Another example of this situation is when a building is shaded from the sun by an adjacent building. In this case some rooms or areas may require heating, while others require cooling, even though located on the same side of the building. Other examples wherein simultaneous heating and cooling is required are situations in which a large number of people are gathered in certain rooms, or in which the rooms contain heat-producing apparatus, such as machinery, flood lights, etc. These rooms, of course, quickly become overheated and require cooling, while adjacent rooms may fall below a comfortable temperature level and require heating.

During those periods when simultaneous heating and cooling of various rooms throughout the building is required, the temperature and volume of the return water becomes excessive and that portion of return water to be cooled places a cooling load upon the refrigeration compressor that may exceed the cooling load encountered on a hot summer day when all heat exchangers in the building are performing cooling functions.

One answer to this problem, of course, would be to provide an oversized refrigeration compressor for the system, but it is obvious that such an expedient would be unnecessarily expensive and inefficient. Another approach to the above problem has been set forth in McFarlan Patent No. 2,796,740. McFarlan teaches the use of "deep" coils, that is, coils that produce a temperature change of from 20 to 25 degrees Fahrenheit in the water passing through the heat exchangers whether the exchangers be set for cooling or heating. If, for example, the cooling water leaves the refrigeration unit at 55 degrees, it will enter the common return at a temperature of between 75 and 80 degrees. In McFarlan's system, the hot water may leave the heating unit at 100 degrees and enter the common return at a temperature of 75 to 80 degrees due to the use of deep coils. As can be readily seen, the temperature of the water in the common return would not vary greatly during heating or cooling operations, and the return water temperature to the refrigeration compressor would be substantially uniform whether the entire building was being cooled or simultaneously heated and cooled in different areas.

When using shallow coils or radiant panel ceilings, however, the problems of temperature and volume of return water become critical, as the temperature differential between the hot and cold return water may be from 20 to 30 degrees Fahrenheit. This is due to the fact that in shallow coil or radiant panel heat exchangers, the temperature change of the cold water passing therethrough is generally between 5 and 10 degrees Fahrenheit and the temperature change of the hot water between 10 and 20 degrees. Thus, if the cold supply water enters the heat exchanger at a temperature of 55 degrees, the temperature thereupon entering the common return would be from 60 to 65 degrees. Hot water entering at a temperature of 100 degrees F., for example, would leave the heat exchanger and enter the common return at a temperature of 80 to 90 degrees F. During the hot summer months when the entire building is being cooled, the temperature of the return water usually does not exceed 65 degrees and the refrigeration compressor is generally sized to handle a full flow of cooling water at this temperature. When the building is being simultaneously heated and cooled, however, the resulting temperature of the mixed return water greatly exceeds 65 degrees. This increased temperature of the return water in the system results in a much greater cooling demand upon the refrigeration compressor, and unless the system is designed with an oversized compressor, it will operate ineffectively.

Accordingly, it is a principal object of this invention to provide an efficient and economical air conditioning system having a common hot and cold water return.

Another object of the invention is to provide an air conditioning system of the above character that efficiently permits simultaneous cooling in any portion or portions of a building and heating in any other portion or portions.

It is a further object of this invention to provide a control arrangement for an air conditioning system of the above character wherein the temperature and volume of the return water is controlled to prevent overloading of the cooling compressor.

It is another object of this invention to provide an air conditioning system of the above character wherein the pressure differential between water supply lines and the return line is maintained relatively constant for all heat exchangers in the system.

Still another object of the invention is to provide an air conditioning system of the above character which may be particularly applicable for use with heat exchangers producing a temperature change of less than 20 degrees F. as heat exchange fluid passes therethrough.

A still further object of the invention is to provide an air conditioning system of the above character that is inexpensive to install and operate.

The invention accordingly comprises the features of construction, combinations of elements, and arrangement of parts which will be exemplified in the constructions hereinafter set forth, and the scope of the invention will be indicated in the claims.

For a fuller understanding of the nature and objects of the invention, reference should be had to the following detailed description, taken in connection with the accompanying drawings, in which:

FIGURE 1 is a schematic drawing of a preferred embodiment of an air conditioning system employing piping and control apparatus of the present invention.

FIGURE 2 is a schematic drawing illustrating another embodiment of an air conditioning system employing piping and control apparatus of the present invention.

Like reference characters refer to like parts throughout the drawings.

In the air conditioning art the term "3-pipe system" is generally applied to a piping arrangement for a series of heat exchangers wherein there is a hot water supply, a cold water supply and a common return for receiving water from the heat exchangers. As can be seen in FIGURES 1 and 2, the heat exchangers $E_1$–$E_8$ may receive water from the hot water supply conduit or pipe 10 or the cold water supply conduit or pipe 12, dependent upon the setting of the three-way valves 24 which may be controlled by thermostats $T_1$–$T_8$. After the water has passed through the heat exchangers, it enters the common return conduit or pipe 14 to be carried back to the heating and cooling apparatus as will be more fully described hereinafter. As can readily be seen, when some of the heat exchangers are set for cooling and others for heating, there will be a mixing of hot and cold water in the common return conduit 14.

When the temperature outside the building is such that all heat exchangers are either heating or cooling, no return water temperature problem is encountered as all of the returned water will be routed through either the cooling or the heating apparatus. In those instances when the outside temperature is between 45 and 60 degrees, however, there occur may situations, as described above, in which simultaneous heating and cooling is required by different heat exchangers in the same system. It is during these conditions that problems are encountered in the cooling portion of the system due to excessive temperatures and quantities of water returned to the cooling apparatus.

In air conditioning systems wherein the heat exchangers may alternatively heat or cool, and are of the shallow coil or radiant panel type, the volume of cold water passing through the heat exchanger during cooling is generally greater than the volume of hot water required for heating. This is due to the fact that the hot water can be economically heated to a high temperature while the cold water cannot be economically cooled below 50 to 55 degrees. In other words, more heat can be extracted from the hot water as it passes through the heat exchanger than can be economically extracted from the cooling water as it passes through a cooling condenser. This difference in required volumes between the hot and cold water to be supplied has resulted in problems of volume control which are obviated by my invention.

One of the problems in particular has been the effective control of the volume of hot water circulating through the system and into the common return. When the volume of hot water in the common return is unnecessarily increased, the temperature of the returned water is proportionately increased. It is this increased temperature of the returned water which imposes a load on the cooling compressor which may exceed the load encountered when all heat exchangers are employed for cooling.

As the pipe sizes for the hot and cold supplies and the common return are designed for the maximum expected flow rates, the volume of water flowing from the hot and cold supply conduits through each heat exchanger and into the common return will be dependent upon the pressure differential between each of the supply conduits and the return conduit at each heat exchanger. For example, when one half of the heat exchangers are heating, and the other half cooling, the pressure differential between each supply conduit and the return conduit at each heat exchanger will be greater, with a resulting increase in water flow through the heat exchangers. This increase in hot and cold water flow into the common return imposes an increased cooling load on the cooling system which may exceed the load encountered during the maximum summer design conditions when all heat exchangers are cooling.

My invention provides an air conditioning system having an automatic volume control for hot water and for cold water, for maintaining the pressure differential available through each heat exchanger within a preselected range, thereby controlling the volume of hot or cold water passing through each heat exchanger regardless of the numbers of heat exchangers which may be heating or cooling In other words, the present invention provides a water volume control for each heat exchanger to avoid the passage of excessive hot water when only some of the heat exchangers are performing a heating function. Furthermore, my invention provides such volume control with a relatively inexpensive system, as pressure differential control devices are required at only a few points in the system.

Generally, as shown in the embodiment of FIGURE 1, the air conditioning system of the present invention comprises a hot water supply conduit or pipe 10, a cold water supply conduit or pipe 12 and a common return conduit or pipe 14 for receiving both hot and cold water from the various heat exchangers $E_1$ through $E_8$. It should be understood that each "heat exchanger" represented by the blocks $E_1$ through $E_8$ may be a number of heat exchangers for a room or area, and is not necessarily a single unit. Heating apparatus 16 and cooling apparatus 18 and their respective pumps 20 and 22 for circulating a fluid or water through the system may be of any known design. Each heat exchanger is provided with a valve 24 which is connected alternatively to either a heating supply branch 26 or a cooling supply branch 28, of the hot or cold supply conduits respectively, for selectively passing either hot or cold water through its associated heat exchanger. In other words, valve 24 may be a three-position valve and can either be closed or set to pass hot or cold water.

In the hot and cold supply conduits, entry valves 30 and 32 are controlled respectively by devices 34 and 36 which are responsive to pressure differentials for maintaining the water in the supply conduits at a preselected pressure differential with respect to the pressure in the return conduit. Such devices are well known in the art. Device 34, for example, is responsive to the pressure differential between the hot supply conduit at point 52 and a point 50 at the beginning of the common return 14. Device 36 is similarly responsive to the pressure differential between the cold supply conduit at point 54 and the same point 50 in the common return conduit 14. A similar pair of valves 38 and 40 are interposed as exit valves to control the water pressures in the hot and cold supply extensions 10a and 12a respectively. Valves 38 and 40 are similarly controlled by pressure-differential responsive devices 42 and 44 respectively, which are actuated by pressure differentials between the supply conduits at points 58 and 60, and the common return at point 56, adjacent the last heat exchanger $E_8$ in the system. Such pressure differential devices are well known in the art as "pressure-stats."

Supply extensions 10a and 12a return excess hot and cold water directly to the pumps 20 and 22 respectively. The common return conduit 14 divides returned water at T-joint 46 in proportion to the volumes of hot and cold water being drawn through the system. Check valves 48 prevent crossover of the hot or cold water.

The following is illustrative of the principles of the invention. If the pressure in the return conduit at point 56 is taken as a reference point (zero), the pressures in the hot and cold supply conduits across heat exchanger $E_8$ will be maintained by pressure differential sensing devices 42, 44 at a preselected level, for example, 20 p.s.i. at point 58 for the hot supply conduit and 30 p.s.i. at point 60 for the cold supply conduit. The pressure drop along the return conduit from point 50 to point 56 may be 10 p.s.i. In accordance with the invention, the pressure drop from point 52 to point 58 along the hot supply and from point 54 to 60 along the cold supply will also be approximately 10 p.s.i. This is accomplished by sizing all three conduits to effect substantially the same pressure drop from left to right as seen in FIGURE 1 for the optimum range of pressures and volumes at which the system is to operate.

With a desired pressure differential of 20 p.s.i. and 30 p.s.i. across heat exchanger $E_8$ between the hot and cold supply conduits and the return conduit, the same pressure differentials may be maintained across exchanger $E_1$ by pressure-differential control devices 34 and 36. A build-up of pressures in the hot and cold supply conduits will take place until the pressure at point 50 in the return conduit is 10 p.s.i. with respect to reference point 56. With the pressure at point 50 at 10 p.s.i., relative pressures of 30 and 40 p.s.i. will be maintained in the hot and cold supply conduits at points 52 and 54 respectively. Because of corresponding pressure drops in all three conduits, the pressure differentials across all intermediate heat exchangers ($E_2$ through $E_7$) will be approximately 20 and 30 p.s.i. for the hot and cold sub-systems respectively, regardless of the number of heat exchangers set for heating or cooling. In certain applications pressure differential control across heat exchanger $E_1$ may not be required.

For a better understanding of the present invention, the operation of the system will now be described under conditions in which heat exchangers $E_1$, $E_2$, $E_3$ and $E_4$ are set for cooling, and heat exchangers $E_5$, $E_6$, $E_7$ and $E_8$ are set for heating. Pumps 20 and 22 force water under pressure through the heating and cooling units 16, 18 respectively, and through their respective supply conduits 10 and 12. With low pressure in the supply conduits, the water will pass through the supply conduits and then through the heat exchangers as determined by the three-position valves 24. The valves 24 associated with heat exchangers $E_1$ through $E_4$ are set for cooling, and will admit cooled water from the branches 28, while the valves 24 associated with heat exchangers $E_5$ through $E_8$ are set for heating and will admit hot water from the hot water branches 26.

The supply conduits 10 and 12 are preferably reduced in size from left to right, as the amount of water to be carried toward the right end of the system as seen in FIGURE 1 will diminish progressively as each heat exchanger is supplied. As each heat exchanger is supplied, the pressures in the supply conduits progressively drop from left to right. The common return conduit is sized to increase in size from left to right to handle an increasing volume as it receives exhausted water from each successive heat exchanger. The pressure drop in the common return conduit corresponds to pressure drops in the supply conduits. In practice, the diminishing or increasing in size of the conduits is generally accomplished by employing pipes of diminishing size, for example, the supply conduits in the area of heat exchangers $E_1$ and $E_2$ may be three inches in diameter, and can be reduced to two and one-half inches, two inches, etc., between successive exchangers or groups of exchangers. The pipe sizes will, of course, be dependent upon the size of the system and total volume of water required.

With the circulating pumps 20 and 22 building up pressure in the supply conduits, the pressure differentials across heat exchanger $E_8$ will soon reach the preselected levels set at the pressure differential devices 42 and 44. Until the preset pressure differentials are reached, the pressure-responsive devices 42 and 44 keep valves 38 and 40 in extensions 10a and 12a closed to build up pressure in the supply conduits 10 and 12. It should be understood that during this phase of the operation, the water may be drawn from an outside source such as a reservoir tank (not shown) for use in the system.

When the predetermined pressure differentials between points 56–58 and 56–60 are achieved, pumps 20 and 22 will continue to build up pressure in the supply conduits. When the pressure differentials between points 50–52 and 50–54 reach the levels set on pressure-differential responsive devices 34 and 36, valves 30 and 32 respectively will be throttled down to maintain the pre-set pressure differentials across heat exchanger $E_1$. Thus the supply pressures across the first and last heat exchangers in the system are maintained at the desired levels.

The pressure differentials across the intermediate heat exchangers $E_2$ through $E_7$ will also be maintained at approximately the same selected levels. This is made possible through the sizing of the supply conduits and the common return conduit, for supply pressures will drop in supply conduits 10 and 12 from left to right as seen in FIGURE 1. But the pressure in the common return conduit 14 also decreases from left to right at corresponding points as the return conduit 14 increases in size from left to right.

In other words, the pressure drop from point 52 to point 52a in conduit 10 may be 5 p.s.i. In accordance with the invention the pressure drop from point 54 to point 54a in conduit 12 and the pressure drop from point 50 to point 50a in return conduit 14 is also approximately 5 p.s.i. This is accomplished by employing conduits of varying size as described above. Thus, when pressure differential devices 34 and 42 are both set for the optimum hot water pressure differential, and devices 36 and 44 are also both set for the optimum cold water pressure differential, the pressure differential across each heat exchanger in the system will be maintained at approximately the same value as the pressure differential across any other heat exchanger performing the same function, i.e., heating or cooling. The result is that no matter how many heat exchangers are set for heating or for cooling, the amount of water flowing through each heat exchanger performing the heating function is maintained at the desired predetermined value selected as optimum for its heating function, while the cooling exchangers are likewise each receiving their optimum preselected flow volumes of cooled water from conduit 12.

For instance, in the above example, only the first four heat exchangers in FIGURE 1 may be set for cooling, but maintenance of the preselected pressure differential between points 50–60 will result in the desired cold water pressure differential across heat exchanger $E_4$ as well as across exchangers $E_1$, $E_2$ and $E_3$. This result is achieved because the successive pressure drops in conduit 12 substantially equal the corresponding pressure drops in the return conduit 14. Maintenance of the preselected pressure differential between points 56–58 will then result in the desired hot water pressure differential across heat exchangers $E_5$, $E_6$, $E_7$ and $E_8$ as the successive pressure drops in conduit 10 substantially equal the corresponding pressure drops in return conduit 14.

It follows that if the function of any heat exchanger is reversed, the pressure differential across that heat exchanger will also automatically be maintained at the desired new level. For example, if exchanger $E_2$ is reset for heataing, the pressure differential across $E_2$ would be substantially equal to the pressure differentials across $E_5$, $E_6$, $E_7$ and $E_8$ because the pressure differential maintained across $E_8$ is "reflected" back to $E_2$, since pressure drops from $E_2$ to $E_8$ are substantially equal in both the conduit 10 and return conduit 14. Thus, it can be readily seen that no matter which heat exchangers may be set for heating or cooling, the control of pressure differentials across the first and last supplied heat exchangers in the system will result in the substantially uniform and optimum pressure differentials across all heat exchangers in the heating portion of the system and the pressure differentials in the cooling portion of the system will likewise be substantially uniform and optimum for the cooling function.

The embodiment of the invention illustrated in FIGURE 2 differs from the embodiment shown in FIGURE 1 in the following respects. As will be noted, the supply conduits or pipes 10 and 12 are not provided with conduit extensions (10a and 12a of FIGURE 1) for returning excess supply water to their respective circulating pumps 20 and 22. Instead, the supply conduits each terminate at the last supplied heat exchanger ($E_8$). Since there is no bypass for excess water supplied, the pressure differential responsive devices 42 and 44 are connected to operate in conjunction with pressure differential responsive devices 34 and 36 respectively to maintain the desired pressures and volumes of water flowing in the system.

The devices 42 and 44 override the control of devices 34 and 36 to maintain the preselected pressure differentials between the supply conduits 10 and 12 and the common return conduit 14. In other words, if the pressure differential across the last supplied heat exchanger exceeds the desired value, the pressure differential devices 42 and 44 will cause devices 34 and 36 to throttle down the supply of water passing through valves 30 and 32. In this respect then, the devices 42 and 44 set the pressure differential limits across the heat exchanger $E_8$, while devices 34 and 36 control the pressure differential across the heat exchanger $E_1$ to keep it within the predetermined range. If supply conduits 10 and 12 have been sized to provide substantially "parallel" pressure drops from the first to the last supplied heat exchanger, which also substantially equals the corresponding pressure drop in the return conduit 14 from the first to the last supplied heat exchanger, it will be seen that the pressure differential across any intermediate heat exchanger will be approximately equal to pressure differentials across the first and last heat exchangers. Since all other factors determining fluid volume flowing through the heat exchangers remain constant, the volume of water flowing through a given heat exchanger can be controlled within a range determined by the settings of pressure differential responsive devices 34, 36, 42 and 44. In other words, no matter how many heat exchangers are in operation or whether they are set for heating or cooling, the volume of the water flowing therethrough cannot exceed the preselected limits. Thus the temperature of the return water will not overload the cooling compressor, because of the automatic control of fluid volume passing through the heat exchangers.

In both embodiments of the invention as shown in FIGURES 1 and 2, safety bypass conduits 62 and 64 have been provided around the cooling and heating units and their respective circulating pumps to prevent excess pressures in supply conduits 10 and 12. For this purpose, valves 66 and 68 may be provided, operated by pressure responsive devices 70 and 72 respectively, which are connected at points 74 and 76 in the supply conduits to direct water to conduits 62 or 64 in the event of excess pressure build-ups in the supply conduits 10 and 12.

A "conventional" shallow coil air conditioning system employing a common return wherein the supply conduits terminate at the last supplied heat exchanger does not provide fluid volume control to permit both heating and cooling in the same system. The volume of water flowing through the heat exchangers of a "conventional" system will be substantially increased in the event that, for example, one half of the exchangers are set for cooling and one half for heating. Assuming that factors such as supply conduit sizes, common return conduit size, and heat exchanger coil sizes remain constant, there would ordinarily be an increase in flow of both hot and cold water to the exchangers for given water pressures when both heating and cooling are occurring simultaneously in different parts of the system. Assuming in a heat-exchanger system that the pipes, heat exchangers, etc., are sized to handle a full flow of twenty gallons per minute when all exchangers are cooling, or ten gallons a minute when all exchangers are heating; such a conventional system would pass approximately 88 gallons per minute of cold water through four heat exchangers set for cooling and 54 gallons per minute of hot water through the four heat exchangers set for heating. Since shallow coil heat exchangers cannot match the return temperatures of hot return and cold return water, the temperature of the exhausted cold water at 65° F. and the temperature of the exhausted hot water at 85° F. will bring the resultant temperature of the mixed water in the common return to approximately 72.5° F. Thus, approximately 88 gallons per minute must be recirculated through the cooling unit, the cooling load would equal 88 g.p.m.×8.33 lb./gal.×60 minutes×12.5°=550,000 Btu./hr. The maximum compressor load when all heat exchangers are set for cooling would be 160 g.p.m.×8.33 lb./gal.×60×5°=400,000 Btu./hr. Thus the cooling load is greatly increased in a shallow coil system by a divided load, part heating and part cooling. With an air conditioning system embodying the present invention, the load on the cooling compressor can be maintained well below 500,000 Btu./hr. for the same pipe sizes, cooling coil sizes, etc., as used in the above illustration.

It will thus be seen that the present invention obviates major problems encountered in air conditioning systems employing a common return conduit in which it is desired to selectively heat and cool spaces supplied by the same hot and cold conduits and serviced by the same return conduit.

It should be understood that the schematic drawings and the examples recited herein are for illustrative purposes only, and in no way should be construed in a limiting sense. It should also be understood that in the claims the recitation of a "heat exchanger" applies equally to a group or series of heat exchangers which may be disposed within a room or space to be conditioned, or on various floors or levels of a building. It should be further understood that the word "system" encompasses an air conditioning system for a building wherein the invention may be employed in various sub-systems, floors, levels or wings of the building; the word "water" in the specification as a heat exchange fluid should also not be construed in a limiting sense, since the invention is operative with a number of heat exchange fluids.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

What I claim as new and desire to secure by Letters Patent is:

1. In an air conditioning system having a plurality of heat exchangers for separate heating and cooling of spaces and wherein exhaust liquid from the heat exchangers is received by a common return conduit, a liquid volume control comprising, in combination, a hot liquid supply conduit having valve means for controlling liquid flow therethrough, a cold liquid supply conduit having valve means for controlling liquid flow therethrough, branch conduits having selector valve means from said supply conduits to each heat exchanger, said supply conduits being diminished in size in the direction of liquid flow, a return conduit connected to receive exhaust liquid from each exchanger, said return conduit having an increase in size in the direction of liquid flow, and means for controlling pressure differentials between the hot liquid supply conduit and the common return conduit and between the cold liquid supply conduit and the common return conduit, said pressure differential controlling means being connected across the first supplied heat exchanger in the system, whereby pressure differential control across the first supplied heat exchanger is reflected to following heat exchangers to maintain the volume of liquid flow of hot and cold liquids through the heat exchangers within preselected limits.

2. A fluid volume control as defined in claim 1 wherein said heat exchangers are of the type having a small number of rows in depth of heat exchange tubing therein.

3. In air conditioning apparatus for simultaneously providing heating and cooling for different areas, comprising in combination a plurality of heat exchangers, a hot liquid supply conduit forming a liquid circulation loop and having means for heating liquid therein, a cold liquid supply conduit forming a liquid circulation loop and having means for cooling liquid therein, pump means for moving a liquid through each of said loops, branch conduits having valve means connecting each liquid supply with each heat exchanger, a common return conduit having a connection to each heat exchanger and having a termination connecting with each circulation loop between said pump means and the last supplied heat exchanger, said supply conduits being diminished in size in the direction of liquid flow, said return conduit having an increase in size in the direction of liquid flow, first supply valve means in each of said supply conduits between said pump means and the first of said branch conduits, second supply valve means in each of said supply conduits between said pump means and the last of said branch conduits, said first supply valve means actuated by pressure differential responsive devices sensingly connected between said hot and cold supply conduits and said return conduit adjacent the first supplied heat exchanger, said second supply valve means actuated by second pressure differential devices sensingly connected between each of said hot and cold supply conduits and said return conduit adjacent the last supplied heat exchanger whereby pressure drops along the return and both supply conduits are approximately equal at corresponding points along the system, so that the liquid pressure drop across each intermediate heat exchanger for hot and cold liquids approximates the liquid pressure drop for hot and cold liquids across the first and last supplied heat exchangers.

4. The combination defined in claim 3 wherein said heat exchangers are of the type having a small number of rows in depth of heat exchange tubing therein.

5. An air conditioning system comprising, in combination, a plurality of heat exchangers, a hot liquid supply conduit having branch conduits to each heat exchanger, liquid heating means in said hot liquid supply conduit, said hot liquid supply conduit forming a liquid circulation loop and being diminished in size in the direction of liquid flow in the area adjacent said branch conduits, a cold liquid supply conduit having branch conduits to each heat exchanger, liquid cooling means in said cold liquid supply conduit, said cold liquid supply conduit forming a liquid circulation loop and being diminished in size in the direction of liquid flow in the area of said branch conduits, a common return conduit having connections to each heat exchanger and having an increase in size in the direction of liquid flow, pump means in said supply loops for moving a liquid under pressure therethrough, said return conduit having a terminating connection with both the hot and cold supply conduit loops between the last supplied heat exchanger and said pump means, supply valve means in each supply conduit between said pump means and the first supplied heat exchanger, first pressure differential responsive means for actuating said supply valve means and having pressure differential sensing connections between said hot liquid supply conduit and said return conduit and between said cold liquid supply conduit and said return conduit adjacent the first supplied heat exchanger, a bypass valve in each supply conduit between the last supplied heat exchanger and said pump means, and second pressure differential responsive means actuating said bypass valves and having sensing connections between said hot liquid supply conduit and said return conduit and between said cold liquid supply conduit and said return conduit adjacent the last supplied heat exchanger whereby the pressure differentials across the first and last supplied heat exchangers in the system for both hot and cold liquids are controlled within predetermined limits, and is reflected to control the pressure differentials across the intermediate heat exchangers for both hot and cold liquids.

6. In air conditioning apparatus having means for supplying heated and cooled liquids under pressure for heating and cooling selected spaces comprising, in combination, a plurality of heat exchangers, a hot supply conduit, a cold supply conduit selector valves connecting each of said heat exchangers, a common return conduit connected to said heat exchangers, said supply conduits being decreased and said return conduit being increased in size in the direction of the liquid flow providing substantially uniform pressure drops at corresponding points therealong, supply valve means for controlling the liquid flow in said supply conduits, and pressure differential responsive means connected across the last supplied heat exchanger for actuating said supply valve means to maintain the pressure differentials across the last supplied heat exchanger within preselected limits, whereby the pressure differentials thus maintained across the last supplied heat exchanger for both hot and cold liquids are reflected to preceding heat exchangers to maintain the desired pressure differentials thereacross.

7. The combination defined in claim 6 wherein said heat exchangers are radiant heat exchange panels.

8. In an air conditioning system having heating and cooling means and means for supplying heated or cooled liquid under pressure to a plurality of heat exchangers, a hot liquid supply conduit, a cold liquid supply conduit, a common liquid return conduit connected to receive exhaust liquid from all heat exchangers, a plurality of branch conduits having selector valves for connection of any heat exchanger with one of said supply conduits, a control valve in each of said supply conduits between the first supplied heat exchanger and sources of heated and cooled liquids, and pressure differential responsive means actuating said supply valves and having sensing connections between each of said supply conduits and said common return conduit across the last supplied heat exchanger; second pressure differential responsive devices having sensing connections between each of said supply conduits and said common return conduit across the first supplied heat exchanger, each of said pressure differential devices for controlling hot and cold liquid flow being respectively connected in series to actuate said supply valve means whereby said pressure differential devices connected across the last supplied heat exchanger normally operate said control valves unless the liquid pressure differential across the first supplied heat exchanger drops below a preselected minimum, said second pressure differential devices then overriding the operation of said control valves.

9. In an air conditioning system having means for heating and cooling heat exchange liquids and for supplying such liquids under pressure to provide heating or cooling for selected areas, the combination, comprising, a plurality of radiant heat exchange panels having means for passing a heat exchange liquid therethrough, a hot supply conduit, a cold supply conduit, selector valve means for connecting any of said panels to either of said supply conduits, a return conduit connected to receive exhaust heat exchange liquid from each of said panels, a first control valve in said hot supply conduit upstream from the first supplied heat exchange panel, a first pressure differential responsive device sensingly connected between said hot supply conduit and said return conduit across the last supplied heat exchange panel, said first device connected to operate said first control valve, a second control valve in said cold supply conduit upstream from the first supplied heat exchange panel, a second pressure differential responsive device connected between said cold supply conduit and said return conduit across the last supplied heat exchange panel, said second device connected to operate said second control valve whereby pressure drops along said supply conduits and said return conduits and said return conduits are approximately equal at corresponding points therealong, and pressure differentials maintained across the last supplied heat exchange panel are reflected to preceding heat exchange panels to control the volume of heat exchange liquid through all heat exchange panels in the system within predetermined limits.

10. In an air conditioning system having a plurality of heat exchangers with a common return conduit wherein exhaust liquid is at substantially different temperatures when received therein, the combination comprising, a hot liquid circulation supply loop including a conduit and means for heating liquid therein, a cold liquid circulation supply loop including a conduit and means for cooling liquid therein, pump means for moving heat exchange liquid through each of said supply loops, a plurality of heat exchangers having selector valves connecting each heat exchanger to each of said liquid supply loops, a common return conduit connected to receive exhaust liquid from each heat exchanger, said return conduit terminating at a connection splitting return flow to each of said supply loops between the last supplied heat exchanger and said pump means, a throttling valve in each of said supply loops between the last supplied heat exchanger and said return conduit terminating connection, a first pressure differential responsive device sensingly connected across the last supplied heat exchanger between said hot supply conduit and said common return, said first device being operable connected to control the throttling valve in said hot supply conduit, and a second pressure differential responsive device sensingly connected across the last supplied heat exchanger between said cold supply conduit and said common return, said second device being operably connected to control the throttling valve in said cold supply conduit.

11. The combination defined in claim 10 wherein said heat exchangers are radiant heat exchange panels.

12. In an air conditioning system having separate hot and cold supply conduits and a common return conduit connecting a plurality of heat exchangers with sources of hot and cold heat exchange liquids wherein individual heat exchangers may be alternatively supplied with hot or cold heat exchange liquids, the combination of means for maintaining substantially equal pressure drops in liquid supply pressures and liquid exhaust pressures between corresponding points in said conduits along the system, a supply valve in each of said supply conduits for controlling the rate of flow of heat exchange liquid therethrough, and pressure sensitive devices across one of said heat exchangers to measure pressure differentials between said common return and each of said supply conduits, said pressure sensitive devices respectively having means for controlling said supply valves, whereby control of pressure differentials for hot and cold liquids across one of said heat exchangers is reflected to other heat exchangers in the system to maintain pressure differentials across all heat exchangers in the system within predetermined limits.

References Cited by the Examiner

UNITED STATES PATENTS

| | | | |
|---|---|---|---|
| 1,606,108 | 11/26 | Sklar | 237—56 |
| 1,787,686 | 1/31 | Kerr | 137—501 |
| 2,363,944 | 11/44 | Carrier | 257—283 |
| 2,796,740 | 6/57 | McFarlan | 257—290 |
| 2,868,461 | 1/59 | Caddis | 237—9 |
| 2,935,857 | 5/60 | McFarlan | 257—290 |
| 2,942,785 | 6/60 | Arbogost | 237—9 |

CHARLES SUKALO, *Primary Examiner.*

HERBERT L. MARTIN, PERCY L. PATRICK,
*Examiners.*